United States Patent [19]

Porter et al.

[11] Patent Number: 4,690,859

[45] Date of Patent: Sep. 1, 1987

[54] FIRE BARRIER FABRICS

[75] Inventors: Rick A. Porter, North Augusta, S.C.; Hans R. Hoernle, Augusta, Ga.

[73] Assignee: United Merchants & Manufacturers Inc., New York, N.Y.

[21] Appl. No.: 721,307

[22] Filed: Apr. 9, 1985

[51] Int. Cl.[4] .................. B32B 3/00; B32B 17/10
[52] U.S. Cl. ......................................... 428/251; 5/459; 5/483; 297/DIG. 5; 427/369; 427/407.3; 428/268; 428/273; 428/307.3; 428/311.5; 428/442; 428/913; 428/920
[58] Field of Search ............ 297/DIG. 5; 5/459, 483; 427/407.3, 369; 428/251, 268, 442, 913, 920, 273, 307.3, 311.5

[56] References Cited

U.S. PATENT DOCUMENTS

| | | | |
|---|---|---|---|
| 4,355,065 | 10/1982 | DeMott | 428/920 |
| 4,495,238 | 1/1985 | Adiletta | 428/921 |
| 4,504,991 | 3/1985 | Klancnik | 5/483 |
| 4,508,775 | 4/1985 | Adiletta | 428/240 |
| 4,525,409 | 6/1985 | Elesh | 428/193 |
| 4,526,830 | 7/1985 | Ferziger et al. | 428/268 |
| 4,540,617 | 9/1985 | Kawanishi et al. | 428/137 |

*Primary Examiner*—James C. Cannon
*Attorney, Agent, or Firm*—Rodman & Rodman

[57] ABSTRACT

A breathable fire barrier fabric comprising a fiber glass fabric on which is coated an encapsulating coating that minimizes or eliminates fiber to fiber self abrasion and effectively adheres to the glass fabric even when subjected to heat and flames; said fire barrier fabric having a porosity value at an acceptable level such that the fire barrier fabric inhibits the spread of fire. The invention contemplates a coating and method of applying same for glass fiber fabrics that can mechanically protect the glass from self-destruction without contributing to the fuel value of the fabric while maintaining a breathable fabric.

28 Claims, 2 Drawing Figures

FIG. 2

FIRE BARRIER FABRICS

BACKGROUND OF THE INVENTION

In 1983, over 37,000 people in the United States alone were seriously or fatally injured in residential and institutional fires, with property damage amounting to about six billion dollars.

Many of these fires were initiated in, or exacerbated by, flammable upholstered furniture or bedding, since the conventional materials used in furniture and bedding such as cotton or polyester padding and foamed polyurethane are a ready source of fuel for the propagation of flames. Thus, it has been considered highly desirable by upholstery and bedding manufacturers to provide some sort of barrier between the flames and the fuel supply in the upholstered furniture or bedding which would cause the flame to extinguish once it reaches the barrier for lack of fuel.

Both government and industry have conducted extensive research into developing such a barrier for home furnishings that would either be nonflammable or at least retard the propagation of a fire. In conjunction with finding an effective material to act as a fire barrier, consumer considerations have required any such materials to be functional, aesthetically acceptable and reasonably priced.

Unfortunately, past efforts to develop a suitable fire barrier have not been very effective. Thus, even fabrics that will not ignite from a smoldering cigarette that are considered to be class 1 fabrics under the UFAC upholstery fabric classification test will burn when placed in contact with an open flame, thus leading to the ignition of the underlying batting in a cushion or mattress.

So-called fire retardant foam coatings for draperies, liners and backcoatings for upholstery, as well as chemical treatments for apparel fabrics that attempt to provide a fire retardant quality to the fabric are commercially available. Unfortunately, these materials are, at best, self extinguishing when the source of the flame is removed. If the flame source is not removed, these materials will char, lose their integrity and, most importantly, not prevent the flame from reaching materials underneath the fabric covering, which act as a major source of fuel for the fire.

Other attempts at solving the flammability problem have centered on the use of inherently nonflammable fabrics such as fiber glass which can be used, for example, in draperies. It has been discovered, however, that the glass fibers are self abrasive in that they rub against each other thereby becoming self-destructing due to the abrasive action. Thus, hand washing and line drying is, out of necessity, the recommended cleaning procedure for such fabrics. Moreover, the brittle and broken glass fibers tend to be very irritating to the skin thus rendering any of the applications of the fabric unsuitable where there is extensive skin contact.

In spite of these difficulties, attempted solutions to the flammability problem have continued to make use of glass fibers due to its inherently nonflammable nature. In this regard, the self-destructing characteristics of fiber glass can be mitigated if the glass fabrics are coated with a suitable material which will encapsulate the fibers with a particular coating, thus minimizing or eliminating skin contact with the fibers. If such coatings are employed for a fire resistant application, the coating itself obviously can not be flammable or a source of fuel.

Such coatings are available and usually consist of a polymeric binder and suitable fillers. For example, the synergistic action of antimony oxide and halogen containing compounds in such coatings is well known. A typical coating of this type may consist of a halogenated polymer such as polyvinyl chloride, polyvinylidine chloride or polyvinyl fluoride or copolymers containing vinyl chloride, vinylidine chloride or vinyl fluoride and finely dispersed antimony oxide. In addition to these compounds, halogenated plasticizers are often employed to alter the hand of the coating as well as to provide a halogen component to the coating. Phosphorous derivatives are also often incorporated to contribute smolder resistance, and aluminum trihydrate is a well known additive since at elevated temperatures, the endothermic decomposition of aluminum trihydrate contributes water vapor to smother the flames.

Other systems employ highly brominated organic compounds such as decarbromodiphenyl oxide with antimony oxide. In noncritical applications where leaching by water is not a factor, simple phosphate salts such as diammonium phosphate have been employed as a fire resistant agent.

Thus, there are an abundance of formulations and recipes known to those skilled in the area of fire retardant chemistry. It has heretofore been widely believed, however, that an effective fire barrier or blocking material would have to be impervious to air to be an effective fire barrier. Thus, prior art coatings for glass fabrics were designed to form an impermeable coating on, for example, fiber glass fabric (Belgian Patent No. 889,724) or the fiber glass fabric was laminated to an impermeable film or foil (U.S. Pat. No. 2,801,427). However, impermeable coatings do not permit the fabric to breathe, and it is well known that fabrics for upholstery or bedding applications need to be breathable in order to be suitable for such applications.

Accordingly, there exists a need for a breathable, nonflammable glass fiber fabric in which the glass is mechanically protected from self-destruction.

SUMMARY OF THE INVENTION

It is an object of the invention to provide a breathable fiber glass fabric that acts as a fire barrier for upholstered furniture and bedding;

It is another object of the invention to provide a breathable fiber glass fabric that acts as a fire barrier for upholstered fabric and bedding and which reduces or eliminates the tendency of glass fibers to self-destruct;

It is yet another object of the invention to provide a process for the production of a breathable fire barrier fiber glass fabric.

These and other objects are achieved by the provision of a breathable fire barrier fabric comprising a fiber glass fabric on which is coated an encapsulating coating that minimizes or eliminates fiber to fiber self-abrasion and which effectively adheres to the glass fabric even when subjected to heat and flames; said fire barrier fabric having a porosity value at an acceptable level such that the fire barrier fabric inhibits the spread of fire.

The fiber glass fabric according to the invention may further comprise a primer coat on the fiber glass fabric to improve the adhesion of the encapsulating coating and, if desired, a top layer, which is part of or placed over the encapsulating coating, to confer on the fire barrier fabric any or all of such properties as non-blocking, water and/or oil repellance, antistatic properties, anti-fungal or anti-microbial properties, anti-soiling properties and deodorant properties.

The acceptable porosity level of the fire barrier fabrics according to the invention is less than about 300 ft$^3$/min/ft$^2$ at $\frac{1}{2}$ inch of water pressure, with a preferable porosity of less than about 250 ft$^3$/min./ft.$^2$.

The encapsulating coating of the fire barrier fabric comprises a binder, filler(s), fire retardant, additives, foaming agents and, if desired, pigments and/or plasticizers. The encapsulating coating is preferably applied to the fiber glass fabric in the form of a semi-stable foam such that when the foam coated fabric is subjected to a mechanical force, the foam collapses and the encapsulating coating is distributed uniformly over the individual fibers of the yarns comprising the glass fiber fabric.

The invention further contemplates a process for applying the encapsulating coating to the glass fiber fabric so as to produce a porous fire barrier glass fiber fabric, which comprises the steps of providing a glass fiber fabric; providing an encapsulating coating; foaming the encapsulating coating to a semi-stable state to a blow ratio of about 2 to 1 to about 15 to 1; maintaining a bank of the foamed encapsulating coating on both sides of the glass fiber fabric; traversing the glass fiber fabric across a horizontal pad, the nips of which serve to control the amount of the encapsulating coating picked up by the fabric; initiating collapse of the semi-stable foam by a mechanical means such that the encapsulating coating is distributed uniformly over the individual fibers of the yarns comprising the fabric; drying and curing the glass fiber fabric on which the encapsulating coating is uniformly distributed; the resultant fire barrier fabric having an acceptable porosity value such that the fire barrier fabric inhibits the spread of fire.

DETAILED DESCRIPTION OF THE INVENTION

In accordance with the invention, it has surprisingly been discovered that breathable glass fabrics can act as effective fire barriers while mechanically protecting the glass fibers making up the fabric from self-destruction. The novel glass fiber barrier fabrics according to the invention function as effective barriers either as face fabrics in, for example, bedspreads, quilts or mattress ticking, or as fabrics underlying the face fabrics such as in upholstered furniture where the face fabric is one of those conventionally used for furniture and the barrier fabric lies between the face fabric and the batting and cushioning material of the piece of upholstered furniture. Where the two layer fabric construction is used, such as in upholstered furniture, the two fabrics (face and barrier) can be attached sequentially to the cushion or furniture frame. In the alternative, a prelaminated fabric consisting of a face fabric adhesively laminated to the fire barrier fabric may be employed.

It has also been discovered that where these novel fire barrier fabrics are used, the underlying cushioning materials such as polyester fiber fill or polyurethane foam need not be specially treated nor formulated for fire retardance. It is preferred, however, that the underlying cushioning materials possess some degree of fire retardancy for optimum effect.

The novel fire barrier fabrics according to the invention comprise a woven or non-woven glass fabric and a coating designed to encapsulate the glass fibers. The coating comprises an optional primer layer, an encapsulating coating layer and an optional top layer to confer special desired properties to the fabric such as non-blocking, water and/or oil repellance, antistatic properties, antifungal or antimicrobial properties, anti-soiling properties and deodorant properties. The optional primer layer acts to improve the adhesion of the encapsulating coating to the fiber glass.

Significant to the fire barrier utility of the novel fire barrier fabrics is that they possess an acceptable porosity value and that when the fire barrier fabric is exposed to fire the porosity does not increase to an unacceptably high value. Preferably, the porosity should remain unchanged or decrease under fire conditions.

To demonstrate an effective fire retardancy, the novel fire barrier fabric, which comprises the glass fabric and applied coating which includes the encapsulating coating layer and any of the optional primer layer and top coat, should possess an acceptable porosity value of about 300 or less cubic feet per minute per square foot of fire barrier fabric when measured at one half inch of water pressure, with a preferred acceptable porosity value of less than about 250 ft$^3$/min/ft$^2$. A most preferred acceptable porosity value lies in the range of about 35 to 250 ft$^3$/min/ft$^2$. It has been discovered that a porosity value significantly in excess of about 300 ft$^3$/min./ft$^2$ is detrimental to the fire retardancy of the fire barrier fabric when the fire barrier fabric is used in conjunction with known batting and cushioning materials such as urethane foam.

Suitable fabrics are those that possess an acceptable porosity value when coated with the encapsulating coating and the optional primer layer and top coating and include woven glass fabric such as plain weave, basket weave, leno weave, twill weave, crowfoot satin or long shaft satin, and knit fabrics such as warp knits and weft knits. Non-woven glass mats are also suitable. The construction of the fabric should be such that, after it has been coated, the porosity value of the coated fabric which includes any desired optional primer layer and top coat with the encapsulating coating, is not higher than the acceptable porosity value for the particular type of fabric utilized. Where the barrier fabric is the face fabric, such as in, for example, mattress tickings, mattress and pillow covers, other weaves such as twill, satin or Jacquard may be employed.

For upholstery applications, where the fire barrier fabric lies below the face fabric, suitable plain weave fabrics include those having warp counts (the number of yarns per inch) of from about 40 to 120 and filling counts of from about 30 to 60. Preferred fabric weights range from about 2.0 to 8 oz/yd$^2$ and most preferred fabric weights range from about 2.5 to 5 oz/yd$^2$.

While any of the commerical glass compositions useful for glass fiber can be used in the fire barrier fabrics according to the invention, coated "E" glass shows better abrasion and flex cracking resistance and therefore is preferred for use in the invention.

In the selection of a glass fabric for conversion to a fire barrier fabric, it is preferred that the porosity of the glass fabric, prior to coating, be of the acceptable value as discussed hereinbefore. However, a glass fabric of higher than an acceptable porosity value can be employed provided that the porosity value of the final coated fire barrier fabric is within the acceptable value range for that particular fabric employed and that during a fire the porosity value does not increase to an unacceptable value. The preferred coating is one which reduces the porosity of the fabric.

Suitable encapsulating coating layer compositions comprise a binder, filler(s), fire retardant additives, foaming agents and optionally, pigments and/or plasticizers. The continuous medium can be water or an organic solvent; however, water is preferred because of environmental considerations. In order to achieve an acceptable porosity value in the fire barrier fabric it has been found to be desirable to apply the encapsulating coating as a semi-stable foam, with the coating being free of defoaming agents.

Binders suitable for use in the encapsulating coating include emulsion polymers such as vinyl chloride polymers, ethylene/vinyl chloride copolymers, vinylidine chloride/alkyl (meth) acrylate copolymers, vinyl chloride/vinyl acetate copolymers, neoprene polymers, vinyl acetate/alkyl acrylate copolymers or combinations thereof. It is preferable that at least a portion of the binder consist of a polymer containing chlorine or fluorine. Suitable fillers include clay, calcium carbonate, talc or titanium dioxide, and suitable fire retardant additives include antimony trioxide, antimony pentoxide, aluminum trihydrate and decabromodiphenyl oxide.

A preferred coating having fire retardant qualities is a mixture of antimony trioxide and an organohalogen compound. The source of halogen can be from the polymeric binder, e.g., polyvinyl chloride, or a copolymer containing vinyl chloride. Where the binder contains no halogen, suitable halogen donors such as decabromodiphenyl oxide may be added to the composition.

Depending on the selection of the polymeric binder, it may be necessary to incorporate plasticizers into the encapsulating coating composition so as to avoid stiffening of the fabric. While a wide variety of organic plasticizers are suitable for softening the encapsulating coating, it is preferable to use phosphate ester plasticizers which contribute fire retardancy to the coating. Most preferred are halogen containing phosphate esters such as tris (p-chlorophenyl) phosphate, tris (2, 3 dichloropropyl) phosphate and the like.

It is preferred to apply the encapsulating coating to the glass fibers in the form of a semi-stable foam, so as to better achieve an acceptable fire barrier fabric porosity value. While any foaming agent may be employed, suitable foaming agents include ammonium stearate, fatty acid alkanolamides, salts of fatty alcohol sulfates and sulfonates, ethoxylated alkyl phenols and salts of sulfated ethoxylated alkyl phenols.

The selection of the components of the encapsulating coating composition should be such that the encapsulating coating, once dried on the fiber glass fabric, (a) does not detract from the non-flammability of the base glass fiber fabric (b) does not emit toxic fumes or smoke when subjected to heat or flames, (c) encapsulates the glass fibers so as to prevent fiber to fiber self-abrasion and effectively eliminates direct contact of glass fibers with the human body (d) effectively adheres to the glass fabric even when subjected to heat or flames and (e) maintains the fabric porosity within an acceptable value range even when subjected to heat or flames.

As previously described, the encapsulating coating layer composition is capable of being mechanically foamed to a semi-stable foam. The semi-stable foam should be a foam of sufficient stability such that it can be transported through pipes or hoses from the foaming device to the applicator device and coated onto the fabric without any significant collapse of, or liquid drainage from, the foam; however, when the foam coated fabric is subjected to a mechanical force such as compression, the foam collapses and the composition is distributed uniformly over the individual fibers of the yarns comprising the fabric. These semi-stable foamable encapsulating coating layer compositions are differentiated from foamable compositions producing stable foams in that stable foams do not collapse when subjected to compression. Such stable foamable compositions are of the type used for backcoating of carpets, for example.

The preferred method for application of the semi-stable foamed encapsulating coating foamed composition is by means of a horizontal pad. The encapsulating coating is first mechanically foamed to a semi-stable state to a blow ratio of about 2 to 1 to about 15 to 1. The blow ratio is defined as the ratio of the weight of a given volume of unfoamed coating composition to the weight of an equal volume of the foamed composition. A bank of the semi-stable foam is maintained on both sides of the fabric and as the fabric traverses the pad, the nips of the pad serve both to control the amount of the encapsulating coating layer composition picked up by the fabric and to initiate collapse of the foam, although other mechanical means may be utilized to effectuate collapse of the semi-stable foam. The fabric then turns an angle of about 90° either on one of the pad rolls or on an idler roll disposed beneath the horizontal pad. The coated fabric then passes into a drying and curing oven. Optionally, the fabric may pass over and under trailing knives set at about 80° to the travel of the fabric before going into the oven, the knives serving to smooth the coating and press it into the fabric.

The quantity of encapsulating coating layer applied to the fabric preferably ranges from about 5% to 50% and most perferably from about 8 to 30%, based on the weight of the fabric. It is important to ensure that sufficent coating be applied to completely encapsulate the glass yarns. Too much coating, however, can be detrimental since it tends to stiffen the hand of the fabric and to reduce the breathability of the fabric.

Prior to the application of the encapsulating coating to the fabric, an optional primer layer coating or treatment can be given to the glass fabric to improve adhesion of the encapsulating coating layer. Suitable primers include coupling agents such as organosilanes or organotitantes. These can be blended with emulsion acrylic polymers and applied from dilute aqueous dispersions to the fabric prior to the application of the encapsulating coating layer.

Where it is desired to confer to the coated fabric properties such as water repellency, soil repellency, anti-fungal, anti-bacterial, ant-blocking or anti-static properties, a top coating of suitable chemicals can be applied to the fire barrier fabric. The top coating finish is perferably applied from an aqueous solution or dispersion of the finishing chemicals by padding where total coverage is desired or by kiss roll application where a one-sided application is needed. While the finishing chemicals can be incorporated into the encapsulating coating layer, they are more effective when applied as a top finish to the fabric over the already applied encapsulating coating layer. The finishing chemical used to confer the previously described properties are well known to those skilled in the art of textile finishing, and include such compounds as quaternary slats of an amino silane and Scotchgard FC-214-30, a fluorcarbon soil release composition manufactured by the 3M corporation.

The invention is described in further detail by the following examples.

EXAMPLE 1

To test the fire barrier properties of the coated fire barrier fabrics according to the invention a mock chair frame was constructed of $\frac{1}{8}$ inch pressed asbestos board. Cushioning consisted of two blocks (the seat block 5×8×2 inches, the back block 8×8×2 inches) of urethane foam set at right angles to each other. For control tests, the blocks were individually wrapped with typical upholstery fabrics. To test the fire barrier fabrics, the blocks were first wrapped with the fire barrier fabrics and then with upholstery fabric. The mock chair was placed on a balance in order to measure weight loss during combustion to determine the efficacy of the fire barrier fabrics.

Figure 1:
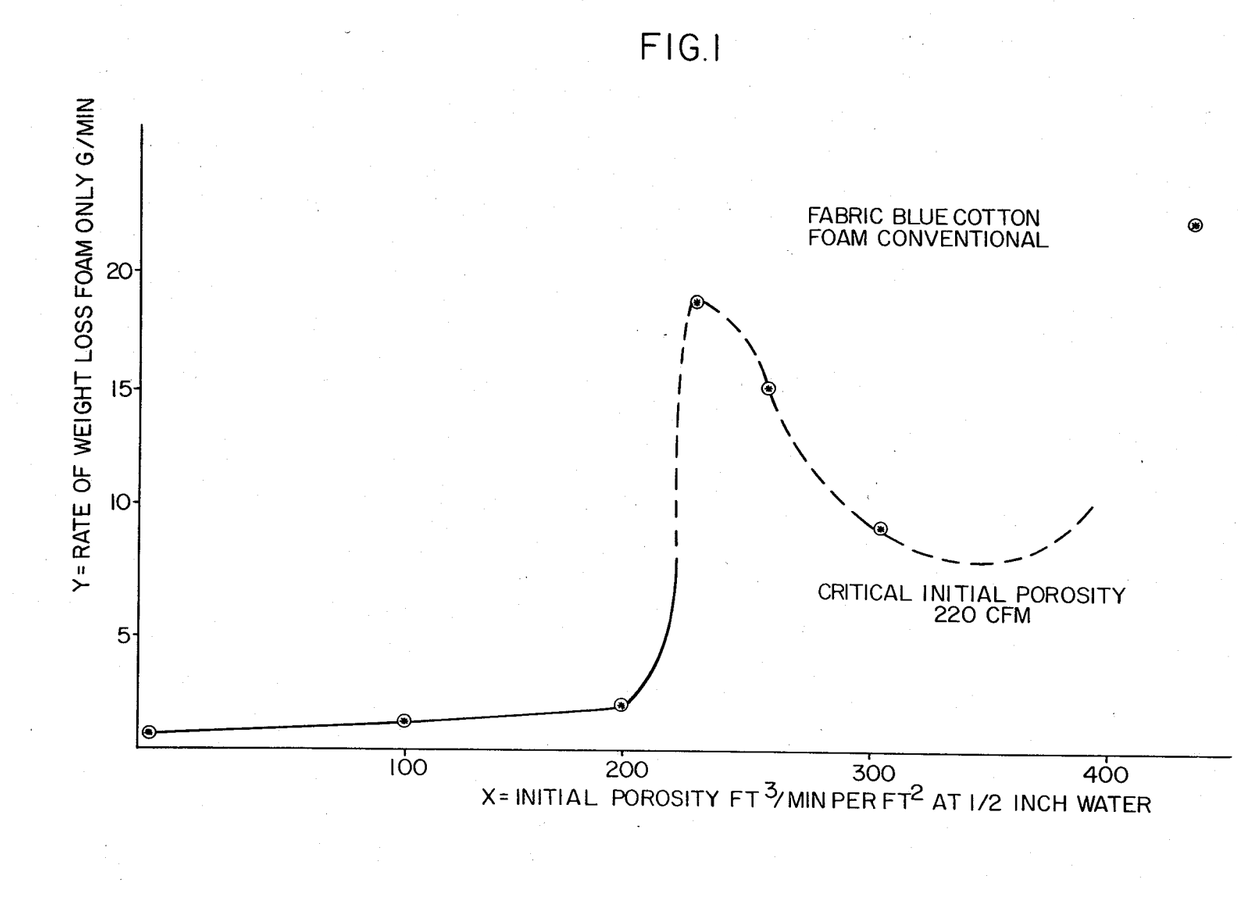
FIG. 1 illustrates the rate of weight loss during combustion of a simulated upholstered chair containing the fire barrier fabric according to the invention in relation to the porosity level of the fire barrier fabric.

Both conventional and self-extinguishing urethane foams were used in the test. For initial testing, uncoated glass fabrics of various constructions were used. The face fabric was a 100% cotton upholstery fabric and burned completely in the National Fire Protection Association 128 vertical test, while the breathable fiber glass fabrics according to the invention were found to be effective fire barriers. Above the highest acceptable porosity value, there was a rapid increase in the rate of weight loss of the mock chair during combustion (FIG. 1), which is an indication of the burn rate.

The highest acceptable porosity value was found to be a function of the flammability of the particular urethane foam used in the chair. For the conventional unretarded urethane foam, the highest acceptable porosity value was about 220 ft$^3$/min./ft$^2$ of fire barrier fabric when measured at one half inch of water pressure, while for the self-extinguishing, treated HR20 isothane CMHR urethane foam manufactured by Recticel Foam Corporation, the highest acceptable porosity value was about 250. Thus, known glass fabrics above an acceptable porosity value can actually be detrimental to fire barrier performance.

EXAMPLE 2

A heat cleaned plain weave glass fabric having a count of 60 warp ends per inch and 58 fill ends per inch, a weight of 3.16 oz per square yard and a porosity of 80 cu. ft. of air/min/sq. ft. was given a primer finish by immersing the fabric in an aqueous bath consisting of 0.3% of gamma glycidoxypropyltrimethoxy-silane, 4.0% or a 46% solids polyacrylic ester copolymer emulsion, 1.0% or a 25% solids polytetrafluoroethylene emulsion, 2.0% of antimigrant and 0.1% of aqua ammonia (26 Be). The fabric is squeezed through pad rolls and dried. The dry add-on finish is about 1.25% based on the weight of the fabric.

An encapsulating coating layer was prepared by blending the following components:
42.0% water
3.6% antimony trioxide
6.6% chlorinated paraffin wax
6.8% aluminum trihydrate
26.0% ethyl acrylate/acrylonitrile copolymer latex
5.3% ethylene/vinyl chloride copolymer latex
1.0% triaryl phosphate plasticizer
2.3% ethyl acrylate/acrylic acid copolymer latex
0.5% ethoxylated octylphenol
0.5% aqua ammonia
5.2% 33% solution of ammonium stearate The encapsulating coating was mechanically foamed to a blow ratio of 4 to 1 and applied to the fabric using a horizontal pad. The fabric was dried and cured. The amount of the dried encapsulating coating was about 12% based on weight of the fabric.

The porosity value of the resultant fire barrier fabric was 35 cu. ft./min/sq.ft at $\frac{1}{2}$ inch of water pressure. A sample of the fabric was subjected to abrasion using the Wyzenbeck abrader. A backcoated nylon upholstery fabric was the abradent to simulate fabric to fabric abrasion in an upholstered furniture. The glass fabric showed practically no wear after 60,000 cycles.

Two upholstered chairs were constructed. The first chair was constructed of materials presently being used in the construction of chairs for the motel/hotel industry. The second chair was constructed in a similar manner except that the polyester nonwoven scrim immediately below the face fabric was replaced by the fire barrier fabric according to the invention.

Each chair was placed individually in a 11×14×8 foot high room. A paper grocery sack containing about 250 grams of crumpled newspaper was placed on the seat cushion and ignited. The standard chair was completely consumed, while the maximum temperature at the ceiling was 1346° F. and the room flashed over (ignition of gaseous decomposition products) three minutes after ignition of the paper sack. The chair incorporating the fire barrier fabric self-extinguished in five minutes, and the maximum ceiling temperature was only 230° F. There was only charring of the vertical cushion fabric and about half of the seat cushion fabric.

EXAMPLE 3

Standard chair seat cushions were constructed with and without the fire barrier fabric according to the invention.

A five inch thick slab of polyurethane foam was covered with a one inch layer of polyester fiber fill and the assembly encased by a polyester non-woven scrim. The cushion was then covered with a 100% fiber fill encased in a polyester non-woven scrim and covered with the 100% cotton upholstery fabric.

A second set of seat and side cushions were identical in construction except that the polyester non woven scrim was replaced by the fire barrier fabric described in Example 2.

A metal frame two feet high was constructed to hold the cushion. Each cushion was placed on top of the frame and a 2 gallon steel can containing five yards of crumpled paper towels was placed on the ground underneath the cushion. The paper towels were then ignited. The conventional seat cushion quickly ignited and burned with the emission of large quantities of black smoke. There was a large amount of flaming liquid dripping from the cushion, and the cushion was eventually completely consumed.

The corresponding fire barrier fabric containing seat cushion burned only along one edge of the face fabric and self-extinguished when all the fuel in the steel can was consumed. The fire barrier fabric remained intact. The cushion lost only about 10% of its total weight which was primarily in the face fabric.

The side cushions were burned in a similar manner. The conventional cushion was completely consumed. The fire barrier fabric containing cushion lost 50% of its weight; the face fabric was completely burned but the glass fabric remained intact containing the polyester fiber fill even though the heat of the buring face fabric caused partial melting of the polyester.

EXAMPLE 4

The fabric prepared in Example 2 was given an anti-microbial and soil release finish by padding the fabric with an aqueous solution containing 3.0% of DC-5700, a quaternary salt of an amino silane manufactured by the Dow Corning Corporation and 4.0% of Scotchgard FC-214-30, a fluorocarbon soil release composition manufactured by the 3M Corporation. Dry add-on was about 0.25%.

The resultant fabric was converted into a mattress bag into which a conventional mattress was inserted. The thread used to construct the bag was coated glass fiber in accordance with the invention.

The mattress was supported on a box spring on a standard bed frame. The mattress was made up with standard polyester/cotton sheets and polyester fiber filled pillows.

A waste basket stuffed with crumpled paper was set at the side of the bed and the paper ignited. The sheets burned and charred the mattress bag. The maximum temperature at the ceiling of the room was 319° F. and the fire self-extinguished in 9.5 minutes. Where the pillows were also encased in fire barrier fabric bags, the maximum temperature was only 250° F. with a 10.85 minute self-extinguishing time. By covering the box spring as well with a fire barrier fabric bag, the maximum temperature was 210° F., with a 4.67 minute self-extinguishing time. On the other hand, the nonprotected mattress had a self-extinguishing time of 12.5 minutes and the ceiling temperature reached 618° F.

The porosity of the charred but intact mattress bag was determined.

| Source of Fabric | Porosity (ft$^3$/min/ft$^2$ at ½ inch water) |
| --- | --- |
| Fabric before test | 35 |
| Fabric after test | |
| a. non charred area | 22 |
| b. side nearest trash can | 9 |
| c. side opposite trash can | 10 |
| d. top of bag | 9 |

While in the charred area some of the reduced porosity was due to plugging of the fabric from molten polyester, it is clear that the fire barrier coating when exposed to heat reduces fabric porosity to a certain extent since even the uncharred area (item a.) showed a reduction in porosity.

It was also evident that the bag served to entrap some of the gases generated within the mattress because the bag ballooned during the burning. This entrapment probably aids in reducing the chances of flash over due to ignition of such gases.

EXAMPLE 5

Urethane foam blocks with and without the fire barrier fabric cover were tested by ASTM method E-162-79, Standard Test Method for Surface Flammability of Materials Using a Radiant Heat Energy Source.

The fire barrier fabric tested was that described in Example 4.

| | Flame Spread Index | |
| --- | --- | --- |
| Foam | Without Barrier | With Barrier |
| Conventional | 76 | 52 |
| HR20 | 32 | 17 |

EXAMPLE 6

A printable glass fabric was prepared by incorporating a delustrant, barium/cadmium lithopone into the primer finish described in Example 2.

The fabric was then printed with organic pigments using a flame-retardant, vinyl chloride/acrylate ester copolymer pigment binder.

The foamed encapsulating coating of Example 2 was applied to the fabric, dried and cured. The printed fabric was then treated with a soil release finish based on a Scotchgard fluorocarbon.

EXAMPLE 7

Figure 2:
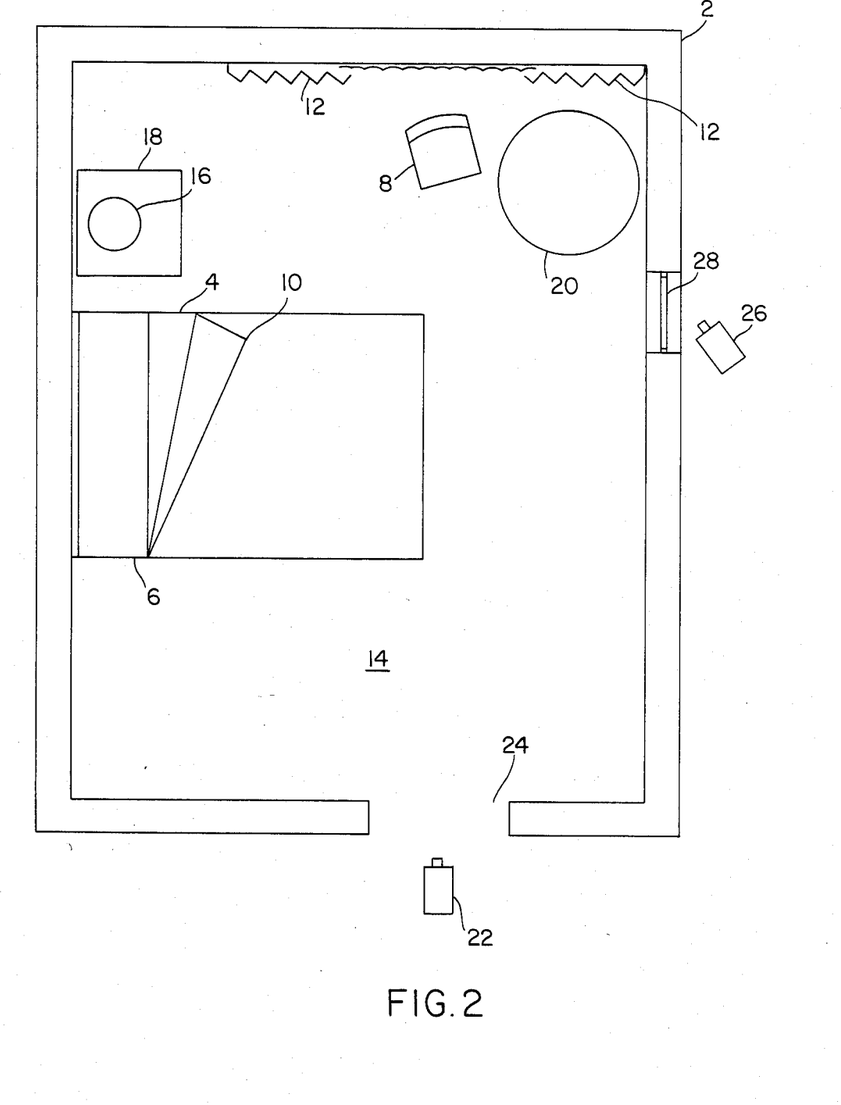
FIG. 2 illustrates a simulated hotel room set up to test the fire retardancy quality of the fire barrier fabrics according to the invention.

A simulated hotel room was set up as shown in FIG. 2. The mattress and pillows were encased in fire barrier fabric as described in Example 4. The upholstered chair was protected with the fire barrier fabric described in Example 2. The bedspread was faced with a printed glass barrier fabric as described in Example 6. The window was hung with glass fabric draperies. The carpet was a densely woven nylon designed to be used without a foam rubber urethane pad. All other materials were of the construction of those presently used in hotel furnishing.

A grocery sack filled with crumpled paper was placed on the seat of the upholstered chair and the paper was ignited with a match. Portions of the seat cushion and back face fabric burned but the fire self-extinguished in five minutes and the maximum ceiling temperature was only 279° F.

In an identical room where no fire barrier materials were used, the room flashed over within 2 minutes, 25 seconds after ignition and ceiling temperature reached 1370° F. before the fire was extinguished with fire hoses.

While there have been described what are presently believed to be preferred embodiments of the invention, it will be apparent to a person skilled in the art that numerous changes can be made in the ingredients, conditions and proportions set forth in the foregoing embodiments without departing from the invention as described herein and as defined in the appended claims.

What is claimed is:

1. A breathable fire barrier fabric comprising a woven fiber glass fabric on which is coated an encapsulating coating that minimizes or eliminates fiber to fiber self-abrasion and effectively adheres to the glass fabric even when subjected to heat and flames; said fire barrier fabric having a porosity value at an acceptable level such that the fire barrier fabric inhibits the spread of fire.

2. The fire barrier fabric according to claim 1 further comprising a primer coat on the fiber glass fabric to improve the adhesion of the encapsulating coating and, if desired, a top coating layer to confer on the fire barrier fabric any or all of such properties as non-blocking, water and/or oil repellance, antistatic properties, antifungal or anti-microbial properties, anti-soiling properties and deodorant properties.

3. The fire barrier fabric according to claim 1 wherein the acceptable porosity level is less than about 300 ft$^3$/min/ft$^2$ at ½ inch of water pressure.

4. The fire barrier fabric according to claim 1 wherein the acceptable porosity level is in the range of about 35 to 250 ft$^3$/min/ft$^2$ at ½ inch of water pressure.

5. The fire barrier fabric according to claim 1 wherein the acceptable porosity level is less than about 250 ft$^3$/min/ft$^2$ at ½ inch water pressure.

6. The fire barrier fabric according to claim 1 wherein the fiber glass fabric is plain weave glass fabric having a warp count of from about 40 to 120, a filling count of from about 30 to 60 and a fabric weight of from about 2 to 8 oz/yd$^2$.

7. The fire barrier fabric according to claim 1 wherein the encapsulating coating comprises a binder, filler(s), fire retardant additives, foaming agents and if desired, pigments and/or plasticizers.

8. The fire barrier fabric according to claim 1 wherein the encapsulating coating is applied to the fiber glass fabric in the form of a semi-stable foam such that when the foam coated fabric is subjected to a mechanical force, the foam collapses and the encapsulating coating is distributed uniformly over the individual fibers of the yarns comprising the fiber glass fabric.

9. The fiber glass fabric according to claim 1 wherein the quantity of the encapsulating coating applied to the glass fiber fabric ranges from about 5 to 50% based on the weight of the fiber glass fabric.

10. The fire barrier fabric according to claim 2 wherein the primer coat comprises a composition selected from the group consisting of organosilanes and organotitanates.

11. The fire barrier fabric according to claim 2 wherein the top coating layer comprises a composition selected from the group consisting of a quaternary salt of an amino silane and a fluorocarbon soil release composition.

12. The fire barrier fabric according to claim 2 wherein the top layer is incorporated with the encapsulating layer and applied to the fiber glass fabric together.

13. A breathable fire barrier fabric comprising:
(a) a woven fiber glass fabric;
(b) a primer coat applied on the surface of the fiber glass fabric;
(c) an encapsulating coating that minimizes or eliminates fiber to fiber self-abrasion and effectively adheres to the primer coat and fiber glass fabric even when subjected to heat and flames and which comprises a binder, filler(s), fire retardant additives, foaming agents and, if desired, pigments and/or plasticizers;
(d) a top coating layer to confer on the fire barrier fabric any or all of such properties as non-blocking, water and/or oil repellance, antistatic properties, anti-fungal or anti-microbal properties, anti-soiling properties and deodorant properties;
said fire barrier fabric having a porosity value of less than about 300 ft$^3$/min/ft$^2$ at ½ inch of water pressure such that the fire barrier fabric inhibits the spread of fire.

14. The fire barrier fabric according to claim 13 wherein the encapsulating coating is applied to the fiber glass fabric in the form of a semi-stable foam such that when the foam coated fabric is subjected to a mechanical force, the foam collapses and the encapsulating coating is distributed uniformly over the individual fibers of the yarns comprising the fiber glass fabric.

15. The fire barrier fabric according to claim 13 wherein the quantity of the encapsulating coating applied to the glass fiber fabric ranges from about 5 to 50% based on the weight of the fiber glass fabric.

16. The fire barrier fabric according to claim 13 wherein the primer coat comprises a composition selected from the group consisting of organosilanes and organotitanates and the top coating layer comprises a composition selected from the group consisting of a quaternary salt of an amino silane and a fluorocarbon soil release composition.

17. A breathable fire barrier fabric comprising a woven fiber glass fabric on which is coated an encapsulating coating that minimizes or eliminates fiber to fiber self-abrasion and effectively adheres to the glass fabric even when subjected to heat and flames; said fire barrier fabric having a porosity value of less than about 250 ft$^3$/min/ft$^2$ at ½ inch of water pressure such that the fire barrier fabric inhibits the spread of fire.

18. A breathable fire barrier fabric comprising a fiber glass fabric whose individual fibers are coated with an encapsulating coating, said coating formed from the mechanical collapse of a semi-stable foam in contact with said fibers to thereby substantially eliminate fiber to fiber self-abrasion and effectively adhere to the glass fiber fabric when subjected to heat and flames; said fire barrier fabric having a porosity value at an acceptable level such that the fire barrier fabric inhibits the spread of fire.

19. A process for applying an encapsulating coating to a glass fiber fabric so as to produce a porous and breathable fire barrier glass fiber fabric, which comprises the steps of:
(a) providing glass fiber fabric;
(b) providing an encapsulating coating comprising a mixture of a binder, filler(s), fire retardant additives, foaming agents and, if desired, pigments and/or plasticizers;
(c) foaming the encapsulating coating to a semi-stable state;
(d) maintaining a bank of the foamed encapsulating coating on one or both sides of the glass fiber fabric;
(e) traversing the glass fiber fabric across a horizontal pad, the nips of which serve to control the amount of the encapsulating coating picked up by the fabric;
(f) initiating collapse of the semi-stable foam by a mechanical means such that the encapsulating coating is distributed uniformly over the individual fibers of the yarns comprising the fabric;
(g) drying and curing the glass fiber fabric on which the encapsulating coating is uniformly distributed;
the resulting fire barrier fabric having an acceptable porosity value such that the fire barrier fabric inhibits the spread of fire.

20. The process according to claim 19(c), wherein the encapsulating coating is foamed to a blow ratio of about 2:1 to about 15:1.

21. The process according to claim 19(b), wherein the binders are selected from the group consisting of vinyl chloride polymers, ethylene/vinyl chloride copolymers, vinylidine chloride/alkyl methacrylate copolymers, vinyl chloride/vinyl acetate copolymers, neoprene polymers, vinyl acetate/alkyl acrylate copolymers, and combinations thereof.

22. The process according to claim 19(b), wherein the filler is selected from the group consisting of clay, calcium carbonate, talc, titanium dioxide, and mixtures thereof.

23. The process according to claim 19(b), wherein the fire retardant additives are selected from the group consisting of antimony trioxide, antimony pentoxide, aluminum trihydrate, and decabromodiphenyl oxide.

24. The process of claim 19(b), wherein the fire retardant additive is a mixture of antimony trioxide and an organohalogen compound.

25. The process according to claim 19(b), wherein the plasticizer is a phosphate ester.

26. The process according to claim 19(b), wherein the foaming agent is selected from the group consisting of ammonium stearate, fatty acid alkanolamides, salts of fatty alcohol sulfates and sulfonates, ethoxylated alkyl phenols and salts of sulfated ethoxylated alkyl phenols.

27. The process according to claim 19(f), wherein the mechanical means are compression.

28. The process according to claim 19 wherein the acceptable porosity value is less than about 300 $ft^3/min/ft^2$ at $\frac{1}{2}$ inch water pressure.

* * * * *

UNITED STATES PATENT AND TRADEMARK OFFICE
CERTIFICATE OF CORRECTION

PATENT NO. : 4,690,859

DATED : September 1, 1987

INVENTOR(S) : Rick A. Porter et al

It is certified that error appears in the above-identified patent and that said Letters Patent is hereby corrected as shown below:

At column 10,

Line 24, after "A" insert --plan view of a--; after "room" insert --2--;

Line 25, after "mattress" insert --4--; after "pillows" insert --6--;

Line 26, after "fabric" insert --(not shown)--; after "chair" insert --8--;

Line 27, after "fabric" insert --(not shown)--;

Line 28, after "bedspread" insert --10--;

Line 29, after "fabric" insert --(not shown)--;

Line 30, after "dow" insert --(not shown)--; after "draperies" insert --12--; after "carpet" insert --14--;

Line 32, after "pad." insert --Also included in the room was a lamp 16, a lamp table 18, and a table 20.--

Line 34, after "nishing." insert --A camera 22 was positioned outside the door opening 24, and a camera 26 was positioned outside window 28.--

Line 35, after "sack" insert --(not shown)--;

Line 36, after "chair" insert --8--.

UNITED STATES PATENT AND TRADEMARK OFFICE
CERTIFICATE OF CORRECTION

PATENT NO. : 4,690,859

DATED : September 1, 1987

INVENTOR(S) : Rick A. Porter et al.

It is certified that error appears in the above-identified patent and that said Letters Patent is hereby corrected as shown below:

Column 10, line 36, after "chair" insert -- 8 --.

Signed and Sealed this

Nineteenth Day of January, 1988

*Attest:*

DONALD J. QUIGG

*Attesting Officer*   Commissioner of Patents and Trademarks